United States Patent
Matsumura

(10) Patent No.: US 7,142,236 B2
(45) Date of Patent: Nov. 28, 2006

(54) DIGITAL ZOOM APPARATUS TO PERFORM ZOOM DURING SUCCESSIVE CHANGES IN ZOOM MAGNIFICATION

(75) Inventor: Hideki Matsumura, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 805 days.

(21) Appl. No.: 10/124,266

(22) Filed: Apr. 18, 2002

(65) Prior Publication Data

US 2002/0154228 A1    Oct. 24, 2002

(30) Foreign Application Priority Data

Apr. 20, 2001    (JP)    ............................. 2001-122074

(51) Int. Cl.
*H04N 5/262*    (2006.01)

(52) U.S. Cl. .................. 348/240; 348/333.12; 348/581

(58) Field of Classification Search ............. 348/240.2, 348/333.12, 581, 231.6, 231.9, 222; 382/298
See application file for complete search history.

(56) References Cited

U.S. PATENT DOCUMENTS

| | | | | |
|---|---|---|---|---|
| 5,428,391 A | * | 6/1995 | Murata et al. ........... | 348/240.2 |
| 5,666,160 A | * | 9/1997 | Hwang .................... | 348/240.2 |
| 5,838,371 A | * | 11/1998 | Hirose et al. ............ | 348/240.2 |
| 5,850,487 A | * | 12/1998 | Takane et al. ............ | 382/298 |
| 6,380,974 B1 | * | 4/2002 | Hieda et al. ............. | 348/222.1 |
| 6,650,368 B1 | * | 11/2003 | Doron ..................... | 348/240.2 |
| 6,762,792 B1 | * | 7/2004 | Matsumura .............. | 348/240.2 |

FOREIGN PATENT DOCUMENTS

| | | |
|---|---|---|
| JP | 05-260445 | 10/1993 |
| JP | 08-279949 | 10/1996 |
| JP | 10-336573 | 12/1998 |

* cited by examiner

*Primary Examiner*—Vivek Srivastava
*Assistant Examiner*—Gevell Selby
(74) *Attorney, Agent, or Firm*—Westerman, Hattori, Daniels & Adrian, LLP.

(57) ABSTRACT

A digital zoom apparatus includes an SDRAM. The SDRAM is stored with YUV data so that horizontal 4 pixels are assigned to each of addresses. A zoom start pixel is specified by a CPU on the basis of a zoom magnification. A memory control circuit transfers two lines of YUV data to a line memory with reference to an address to which the zoom start pixel is assigned, and furthermore, transfers part of the YUV data to a register. The line memory and the register are stored with the YUV data so that one pixel is assigned to each of addresses. The YUV data held in the register is subject to a zoom process with reference to the zoom start pixel, whereby, a through image subjected to an enlargement zooming process is displayed on a display.

8 Claims, 12 Drawing Sheets

FIG. 9
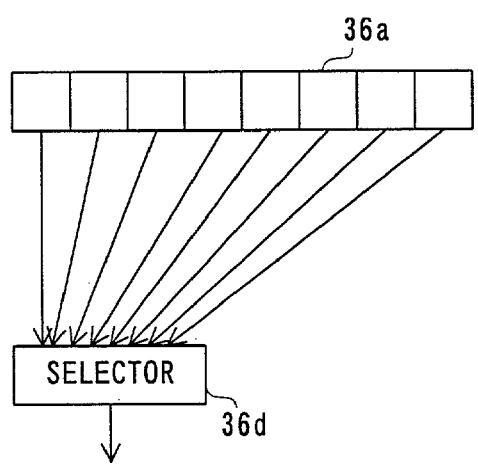
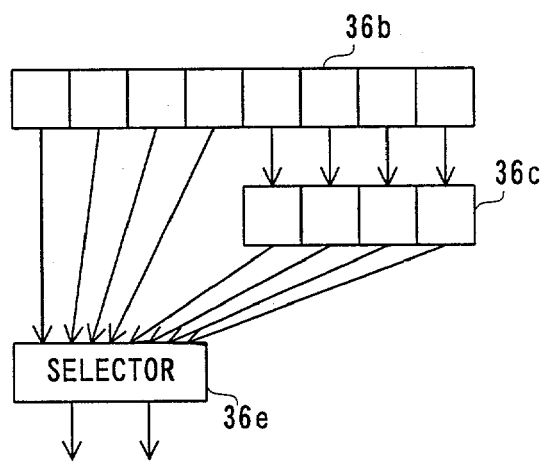
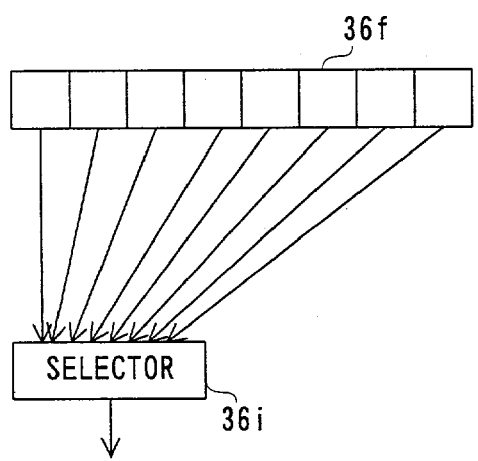
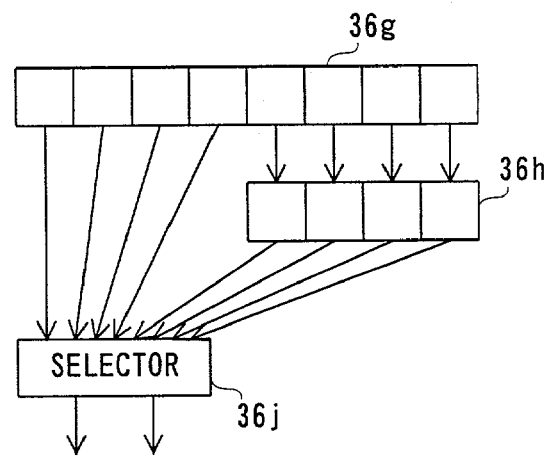

FIG. 10
(A)
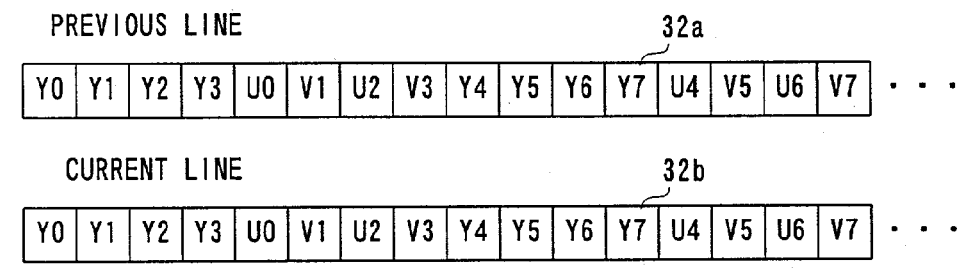
(B)
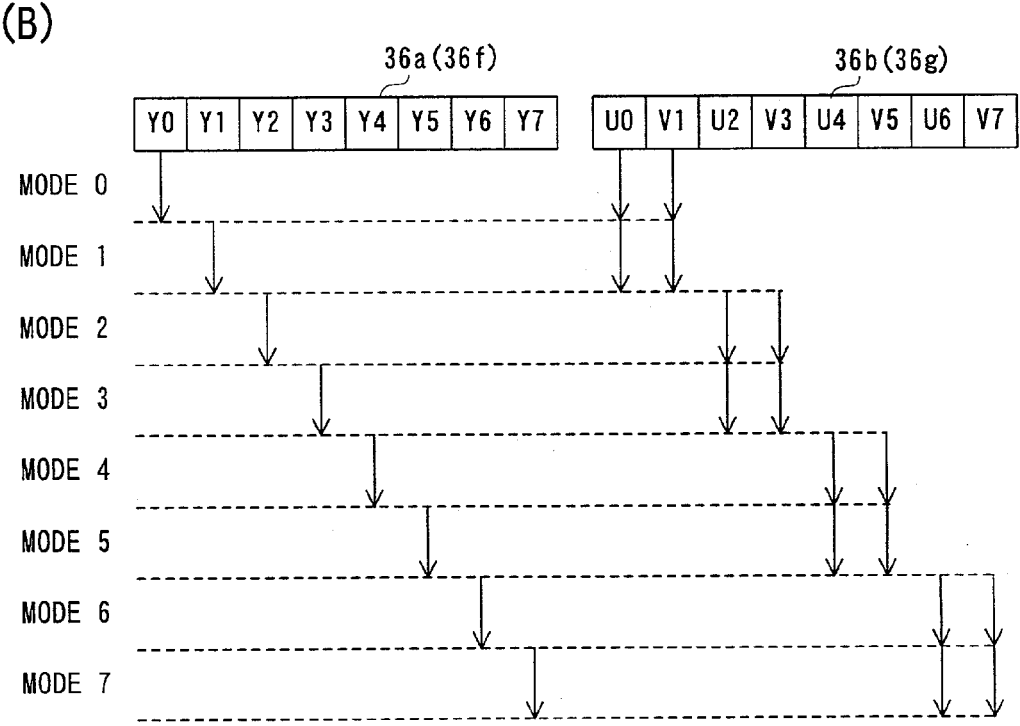

DIGITAL ZOOM APPARATUS TO PERFORM ZOOM DURING SUCCESSIVE CHANGES IN ZOOM MAGNIFICATION

BACKGROUND OF THE INVENTION

1. Field of the Invention

The present invention relates to a digital zoom apparatus applied to a digital camera, for example. More specifically, the present invention relates to a digital zoom apparatus which performs a zoom process in a predetermined direction on image data stored in a memory so that a plurality of pixels are assigned to each of addresses so as to generate zoomed image data.

2. Description of the Prior Art

One example of conventional such a kind of digital camera is disclosed in a Japanese Patent Laying-open No.10-336573 laid-open on Dec. 18, 1998. According to this prior art, image data is stored in a memory so that four pixels are assigned to each of addresses, and zoom processing is started from a top pixel among four pixels assigned to any one of the addresses. However, the prior art is not prepared for successive changes in a zoom magnification, and therefore, a zoom start pixel becomes the top pixel of any one of the addresses in either zoom magnifications. Accordingly, in a case the prior art is directly applied to a digital camera which successively changes the zoom magnification, a change in the zoomed image becomes awkward.

SUMMARY OF THE INVENTION

Therefore, it is a primary object of the present invention to provide a novel digital zoom apparatus.

Another object of the present invention is to provide a digital zoom apparatus capable of smoothly changing a zoomed image in accordance with successive changes of a zoom magnification.

According to the present invention, a digital zoom apparatus which creates zoomed image data by performing a zoom process on image data stored in a first memory such that a first number of pixels are assigned to each address, comprises: a specifier for specifying a zoom start pixel on the basis of a zoom magnification; a second memory having addresses each of which a second number of pixel(s) smaller than the first number of pixels is assigned to; a transferor for transferring the image data from the first memory to the second memory with reference to an address to which the zoom start pixel is assigned; and a zoom processor for performing the zoom process on the image data transferred to the second memory with reference to the zoom start pixel.

The first memory is stored with the image data so that the first number of pixels are assigned to each address. When the zoomed image data is created by performing the zoom process on such the image data, the zoom start pixels is specified by the specifier on the basis of the zoom magnification. The transferor transfers the image data from the first memory to the second memory with reference to the address to which the zoom start pixel is assigned. The second memory is stored with the image data so that a second memory has addresses each of which a second number of pixel(s) smaller than the first number of pixels is assigned to. The image data transferred to the second memory is subjected to the zoom process by the zoom processor with reference to the zoom start pixel. Thus, the zoomed image data is created.

Specifically, the second number of pixel(s) is assigned to each address of the second memory, and the zoom process is executed with reference to the zoom start pixel specified on the basis of the zoom magnification. When the zoom magnification is successively changed, the zoom start pixel being a reference of the zoom process is renewed by a unit of the second number of pixel(s). Accordingly, it is possible to smoothly change a zoomed image.

In a case the zoom start pixel is specified on the basis of an integer required by multiplying a reciprocal of the zoom magnification by a predetermined value and the number of pixels of the image data in a horizontal direction, it is preferable the integer value is continuously renewed by a renewer. A zoomed image displayed on the basis of the zoomed image data is smoothly changed.

In a case the first number of pixels assigned to each of addresses of the first memory are pixels being successive in a horizontal direction, a zoom direction is the horizontal direction. That is, the magnification of the zoomed image is changed at least in the horizontal direction.

In a case a predetermined value multiplied by the zoom magnification is a power of 2, a digital operation process becomes easy.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a block diagram showing one example of a configuration of a register;

FIG. 10(A) is an illustrative view showing a storing state of a line memory;

FIG. 10(B) is an illustrative view showing one example of a reading-out operation from the register;

DETAILED DESCRIPTION OF THE PREFERRED EMBODIMENTS

Figure 1:
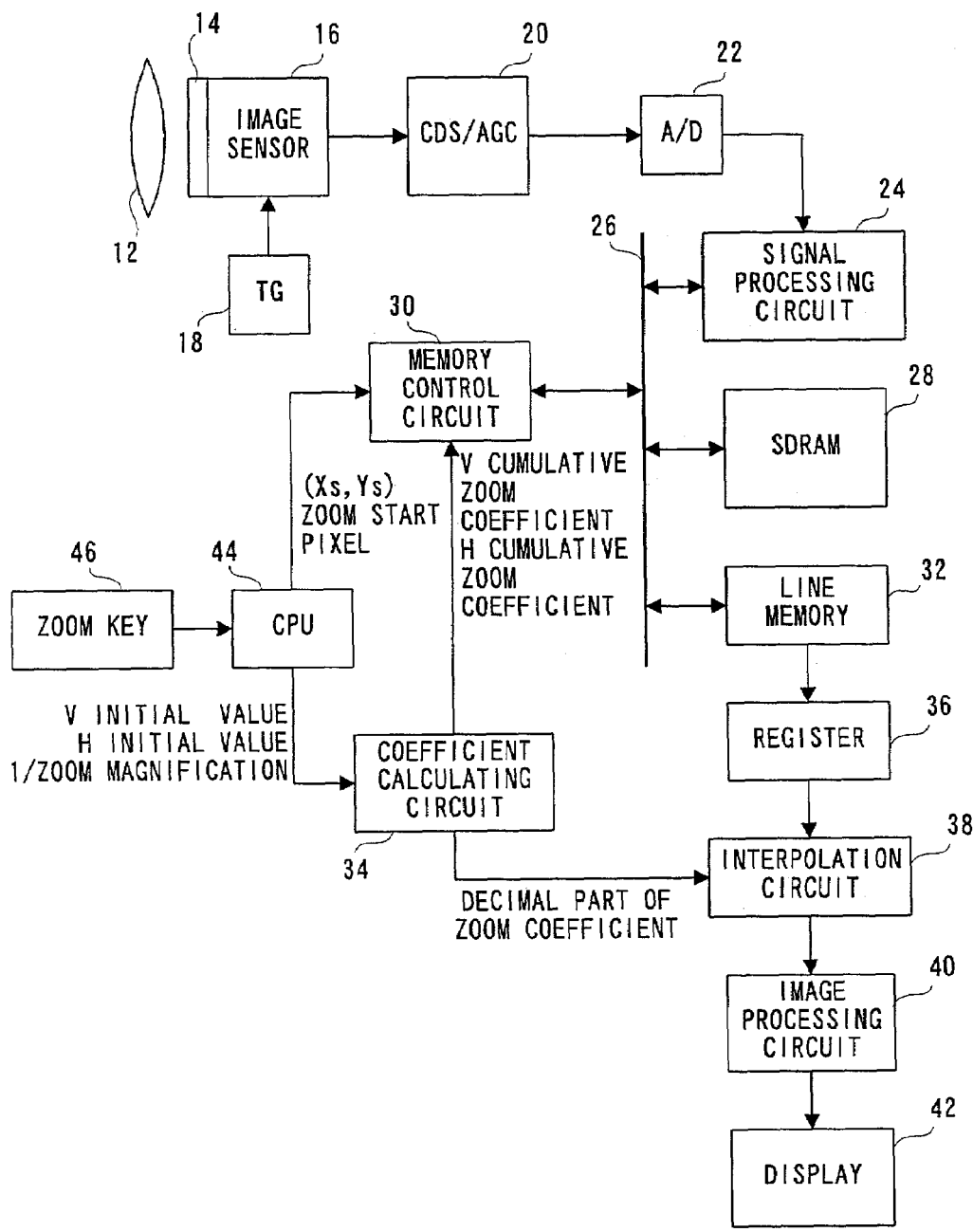
FIG. 1 is a block diagram showing one embodiment of the present invention.

Referring to FIG. 1, a digital camera 10 of this embodiment includes an optical lens 12. An optical image of an object focused by the optical lens 12 is incident to a light-receiving surface of an image sensor 16 through a color filter 14 in which color elements of Cy (Cyan), Ye (Yellow), Mg (Magenta) and G (Green) are arranged in a mosaic form. An electrical charge is generated by photoelectric conversion in each of light-receiving elements (pixel) formed on the light-receiving surface.

Figure 12:
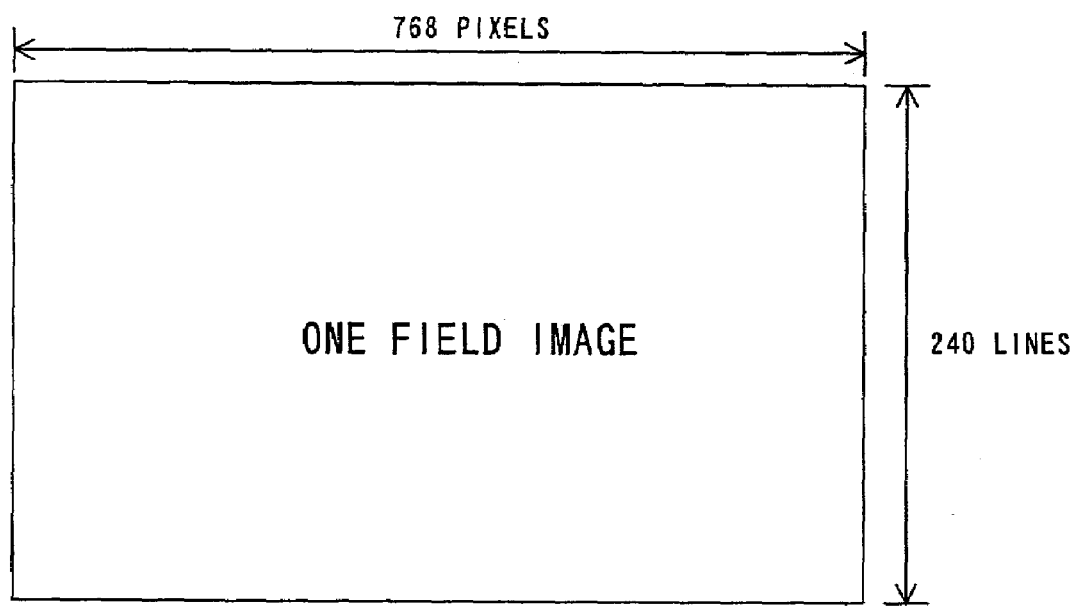
FIG. 12 is an illustrative view showing the number of vertical lines and horizontal pixels of one field image.

A CPU 44 instructs a timing generator (TG) 18 to drive the image sensor 16 so as to output a real-time motion image (through image) of the object from a display 42. The TG 18 generates a timing plus, whereby a pixel signal (electric charge signal) is outputted from the image sensor 16 in an interlace scan scheme. The outputted pixel signal has color information of any one of the Cy, the Ye, the Mg and the G. One field of image signal formed by such the pixel signals has 768 pixels in a horizontal direction and has 240 lines in a vertical direction as shown in FIG. 12.

Figures 2, 3:
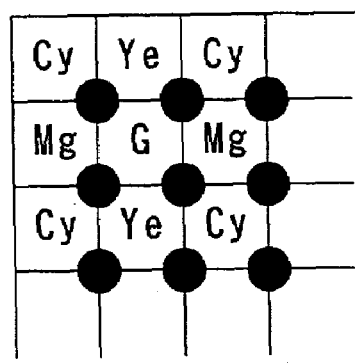
FIG. 2 is an illustrative view showing one example of a configuration of a color filter.
FIG. 3 is an illustrative view showing a part of an operation of a signal processing circuit.

A CDS/AGC circuit 20 performs well-known noise removal and level adjustment on the image signal outputted from the image sensor 16, and the image signal thus processed is converted to digital data, i.e. image data by an A/D converter 22. A signal processing circuit 24 performs a series of processing of color separation, RGB conversion, white balance adjustment and YUV conversion on the converted image data so as to generate YUV data at locations shown by dots in FIG. 3, and samples the generated YUV data at a ratio of 4:2:2. The sampled YUV data is grouped every one word.

Figure 4:
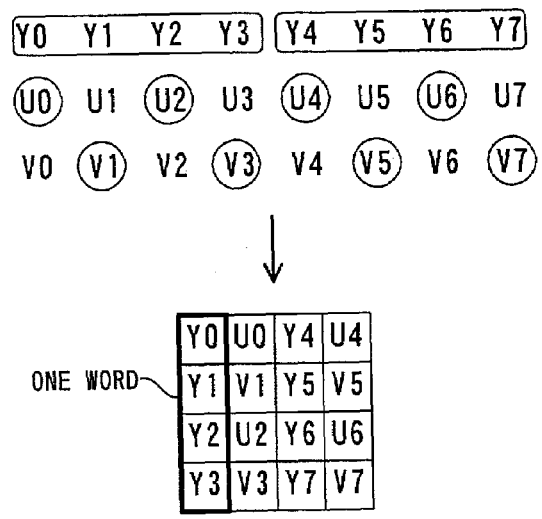
FIG. 4 is an illustrative view showing another part of the operation of the signal processing circuit.

Paying attention to eight pixels of YUV data being successive in a horizontal direction as shown in FIG. 4, Y data is wholly sampled, and one word is formed by four successive pixels of Y data. Therefore, one word is formed by Y0 to Y3 and another word is formed by Y4 to Y7. On the other hand, U0, U2, U4 and U6 are sampled as to U data, and V1, V3, V5 and V7 are sampled as to V data. Then, one word is formed by the U0, the V1, the U2 and the V3, and another word is formed by the U4, the V5, the U6 and the V7. Each of the Y data, the U data and the V data is 8 bits, and one word corresponds to 32 bits. As a result of the sampling at a ratio of 4:2:2, the four pixels of YUV data are fitted to 2 words.

Figure 5:
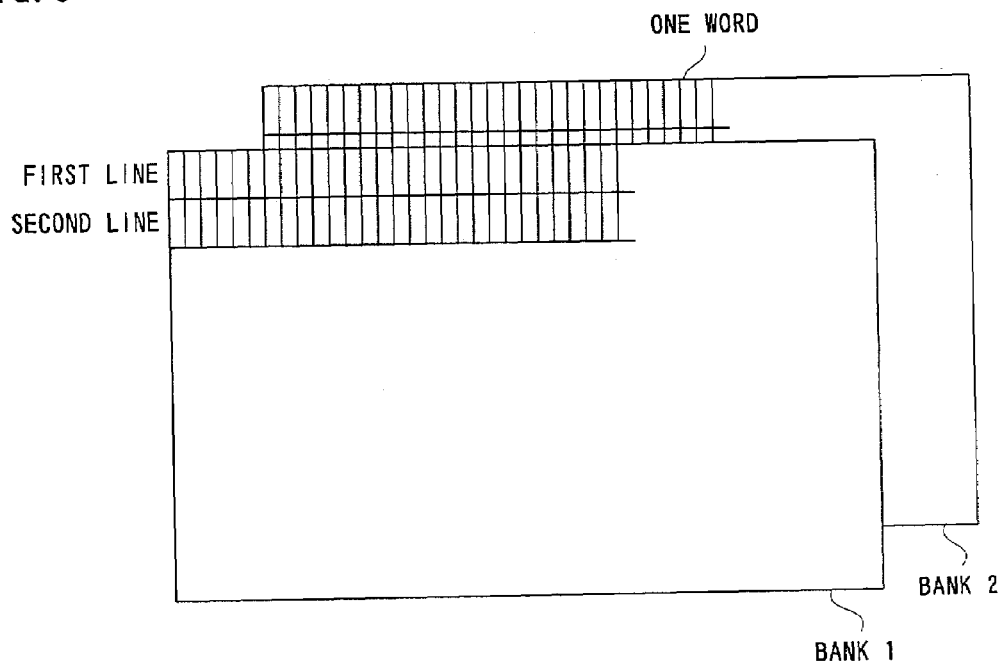
FIG. 5 is an illustrative view showing a part of a mapping state of an SDRAM.

The YUV data grouped by a word by the signal processing circuit 24 is stored in the SDRAM 28 via a 32-bit bus 26 as shown in FIG. 5. The SDRAM 28 includes banks 1 and 2, and one address is 32 bits (=1 word). The Y data forming one field is stored in the bank 1, and the UV data forming the same one field is stored in the bank 2. At this time, the Y data and the UV data which forms the same four pixels are stored in the same addresses of the banks 1 and 2.

When displaying a zoomed image on the display 42, a reading-out start address (Xs, Ys) of the SDRAM 28, a position of a zoom start pixel included in the reading-out start address (Xs, Ys), an initial value of a horizontal interpolation coefficient (H initial value) and an initial value of a vertical interpolation coefficient (V initial value) are determined by the CPU 44 in the below described manner. Herein, the reading-out start address Xs in a horizontal direction, the position of the zoom start pixel and the H initial value are defined as horizontal zoom start information, and the reading-out start address Ys in a vertical direction and the V initial value are defined as vertical zoom start information.

The horizontal zoom start information Hstart is required in accordance with an equation (1).

$$\text{Hstart} = \text{the number of horizontal pixels}/2*(1-1/\text{zoom magnification})*2^8 \quad (1)$$

In case of displaying the zoomed image enlarged to 2.5 times on the display 42 for example, a reciprocal of the zoom magnification is "0.4", the number of horizontal pixels of one field image is "768", and therefore, the Hstart is "58982.4". When utilizing "$2^{10}$(=1024)", "$2^8$(=256)" and "$2^0$(=1), the numerical value is represented by an equation (2).

$$58982.4 = 57*2^{10} + 2*2^8 + 102.4*2^0 \quad (2)$$

Utilizing "$2^8$" is due to a fact that "$2^8$" is in a right side of the equation (1), and utilizing "$2^{10}$" is due to a fact that 4 pixels (=$2^2$) are assigned to one word. According to the equation (2), the reading-out start address Xs is determined to be "57", the zoom start pixel is determined to be the second pixel among the four pixels assigned to the reading-out start addresses (Xs, Ys), and the H initial value is determined to be "0.4(=102.4/256)".

The vertical zoom start information is obtained according to an equation (3) or an equation (4). The equation (3) is an operation expression for obtaining vertical zoom start information Vstart ODD in an odd field, and the equation (4) is an operation expression for obtaining vertical zoom start information Vstart EVEN in an even field.

$$\text{Vstart ODD} = \text{the number of vertical lines}/2*(1-1/\text{zoom magnification})*2^8 \quad (3)$$

$$\text{Vstrt EVEN} = \text{Vstart ODD} + \text{INT}\{(1/\text{zoom magnification}*2^8)/2\} \quad (4)$$

INT: a quotient of division within a parenthesis

Multiplying "$2^8$" is for conforming to the above-described equation (1). The number of vertical lines of one field image is "240", and therefore, when the zoom magnification is "2.5", "18432" is obtained as the Vstart ODD, and "18432" is obtained as the Vstart EVEN. Utilizing $2^8$, these numerical values are shown by equations (5).

$$18432 = 72*2^8 + 0*2^0$$

$$18483 = 72*2^8 + 51*2^0 \quad (5)$$

According to the equation (5), the reading-out start address Ys is determined to be "72" in either the odd field or the even field, the V initial value in the odd field is determined to be "0.0", and the V initial value in the even field is determined to be "0.2(=51/256)".

Figure 6:
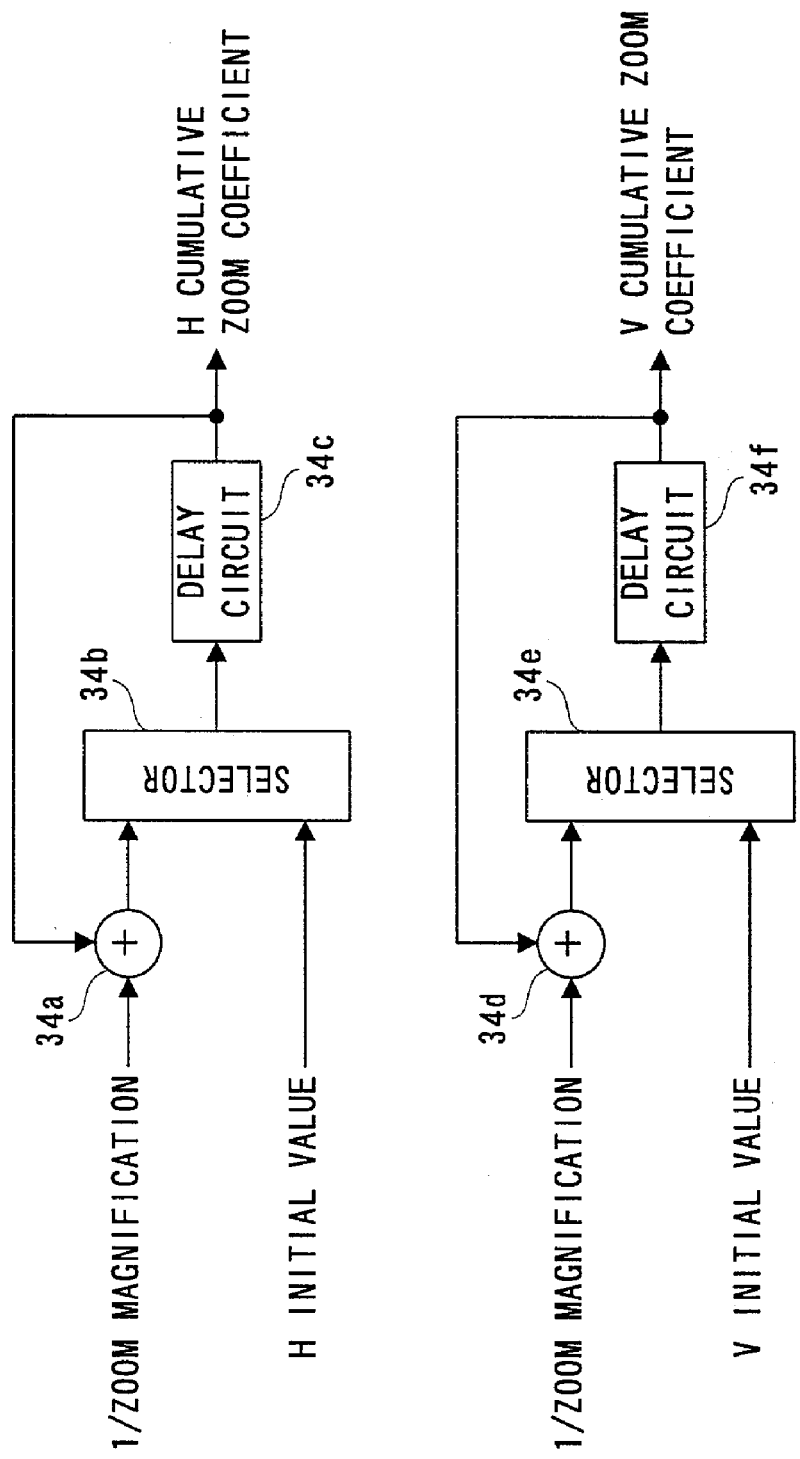
FIG. 6 is a block diagram showing one example of a configuration of a coefficient calculating circuit.

The coefficient calculating circuit 34 is constituted as shown in FIG. 6. The "1/zoom magnification" is applied to an adder 34*a*, and the H initial value is applied to a selector 34*b*. The selector 34*b* selects the H initial value in each field only at first and selects output of the adder 34*a* during the rest of the time period. The output of the selector 34*b* is delayed by a delay circuit 34*c* for a predetermined time, and then outputted as an H cumulative zoom coefficient or fed back to the adder 34*a*. When the zoom magnification is "2.5", the reciprocal of the zoom magnification is "0.4" and the H initial value is also "0.4" according to the equation (2). At this time, the H cumulative zoom coefficient is changed in order of "0.4"→"0.8"→"1.2"→"1.6"→"2.0"→"2.4" . . .

Returning to FIG. 6, the "1/zoom magnification" is also applied to an adder 34*d*, and the V initial value is applied to a selector 34*b*. When the zoom magnification is 2.5 times, "0.4" is applied to the adder 34*d*. Furthermore, according to the equation (5), the V initial value in the odd field is determined to be "0.0", and the V initial value in the even filed is determined to be "0.2". In the same manner as the above description, the selector 34*e* selects the V initial value in each of fields only at first and selects output of the adder 34*d* during the rest of the time period. The output of the selector 34e passes a delay circuit 34f, and then outputted as a V cumulative zoom coefficient or fed back to the adder 34d. Accordingly, the V cumulative zoom coefficient in the odd field is changed in order of "0.0"→"0.4"→"0.8"→1.2"→"1.6"→"2.0" . . . .

Returning to FIG. 1, the reading-out start address (Xs, Ys) and the position information of the zoom start pixel determined by the CPU 44, and the H cumulative zoom coefficient and the V cumulative zoom coefficient calculated by the coefficient calculating circuit 34 are applied to the memory control circuit 30. The memory control circuit 30 firstly detects an integer part of each V cumulative zoom coefficient, obtains a difference between a previously detected integer part and a currently detected integer part, and specifies 2 lines to be read from the SDRAM 28 on the basis of the obtained difference and the reading-out start address Ys. Furthermore, the address in a horizontal direction is specified by the reading-out start address Xs.

Figure 8:
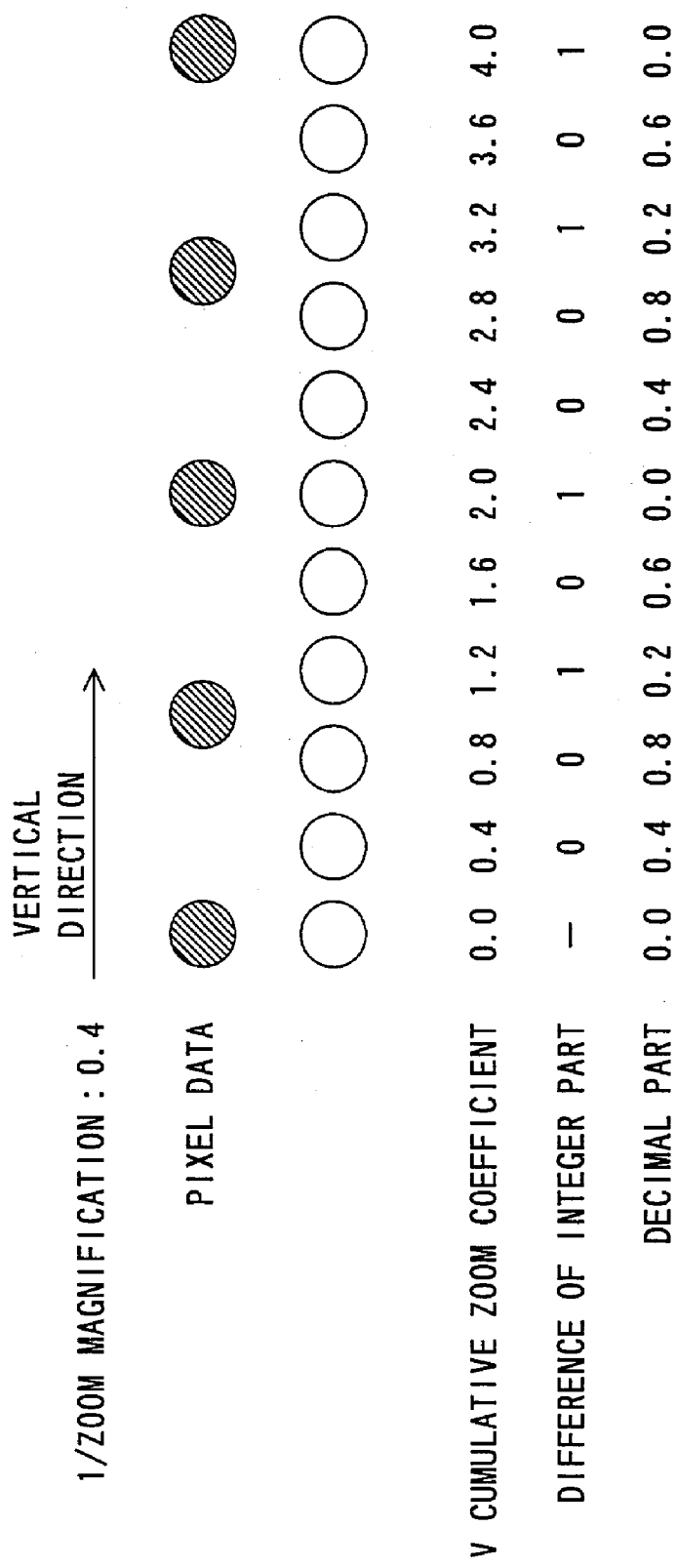
FIG. 8 is an illustrative view showing another part of the operation of the coefficient calculating circuit.

In a case of FIG. 8, when the V cumulative zoom coefficient "1.2" is inputted, the difference of the integer part "1" is obtained. Accordingly, a reading-out destination is lowered by one line from the reading-out start address Ys and whereby determined to be a second line and a third line. In addition, according to the equation (2), since the reading-out start address Xs is "57", the pixel data after the fifty seventh address in the horizontal direction in the second and the third lines are read out by one word. A clock rate for reading-out is 30 MHz, and the read two lines of pixel data is written to the memory areas 32a and 32b of a line memory 32 (referring to FIG. 10(A). It is noted that one address is 8 bits in the memory areas 32a and 32b, and the Y data, the U data or the V data which forms one pixel is written to the one address.

The memory control circuit 30 then reads out 8 pixels of YUV data from each of memory areas 32a and 32b at a clock rate of 30 MHz during four clocks and writes a total 16 pixels of the read YUV data to the memory areas 36a, 36b, 36f and 36g formed on the register 36 shown in FIG. 9. As shown in FIG. 10(A), the memory areas 32a and 32b of the line memory 32 are hold with the YUV data of a previous line and a current line, respectively. Therefore, as shown in FIG. 10(B), the Y0 to Y7 data of the previous line are written to the memory area 36a, and the Y0 to Y7 data of the current line are written to the memory area 36f. Furthermore, the U0, the V1, the U2, the V3, the U4, the V5, the U6 and the V7 data of the previous line are written to the memory area 36b, and the U0, the V1, the U2, the V3, the U4, the V5, the U6 and the V7 data of the current line are written to the memory area 36g.

It is noted that the U4, the V5, the U6 and the V7 data of the previous and current lines are also written to the memory areas 36c and 36h, respectively. In addition, one address is 8 bits in the memory areas 36a to 36c and memory areas 36f to 36h, and the Y data, the U data or the V data which forms one pixel are written to the one address.

When 8 pixels of YUV data in the previous line and 8 pixels of YUV data in the current line are transferred to the register 36, the memory control circuit 30 reads out the pixel data from the memory areas 36a to 36c and 36f to 36h at a clock rate of 15 MHz. Each of selectors 36d, 36e, 36i and 36j selects desired pixel data in accordance with a mode signal outputted in response to the clock of 15 MHz from the memory control circuit 30. More specifically describing with referring to FIG. 10(B), each of the selectors 36d and 36i selects the Y0 to the Y7 in modes 0 to 7, respectively. Furthermore, each of the selectors 36e and 36j selects the U0 and the V1 in each of the modes 0 and 1, the U2 and the V3 in each of the modes 2 and 3, the U4 and the V5 in each of the modes 4 and 5, and the U6 and the V7 in each of the modes 6 and 7. It is noted that each of the Y data and the UV data is renewed by one word when the mode is shifted from "3" to "4" or from "7" to "0".

Figure 7:
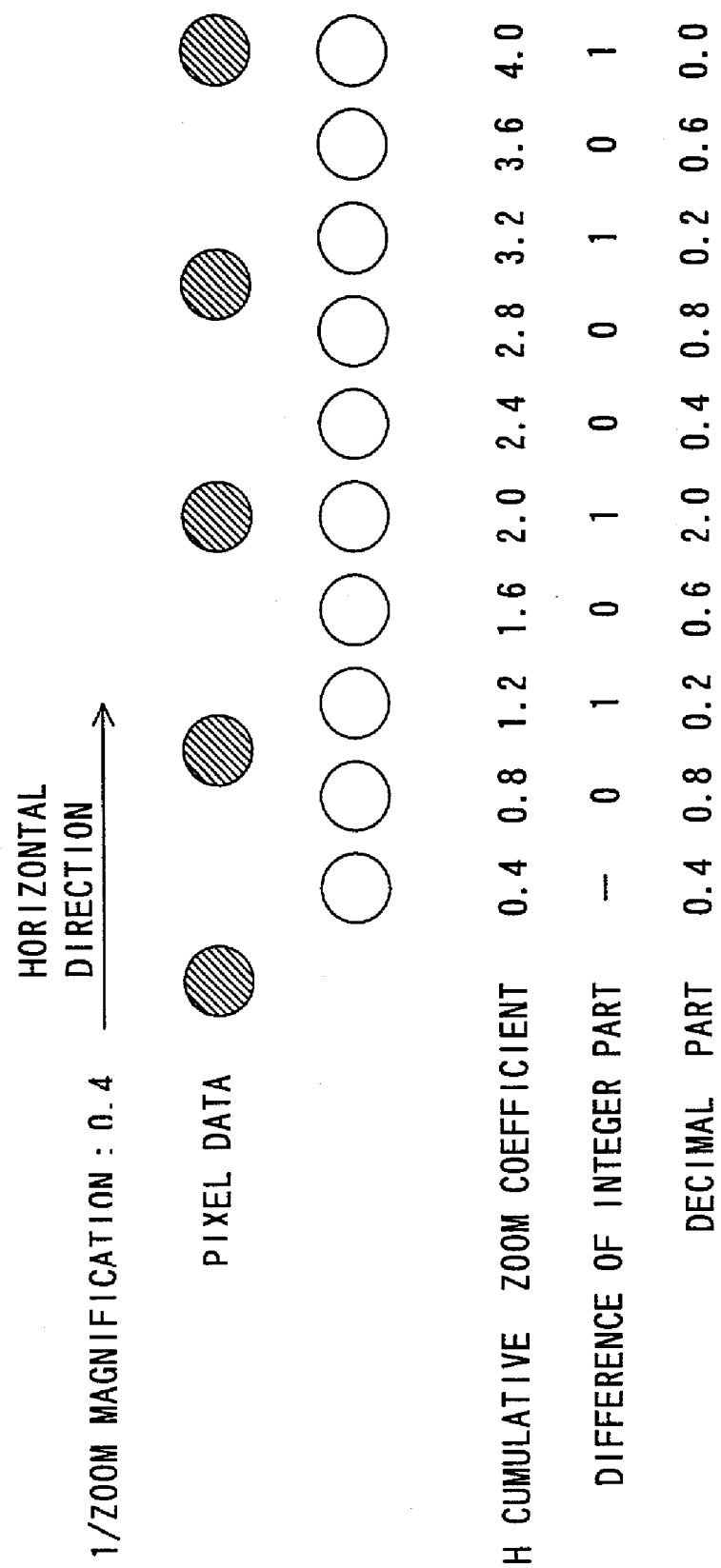
FIG. 7 is an illustrative view showing a part of an operation of the coefficient calculating circuit.

The mode is determined on the basis of the position information of the zoom start pixel and the H cumulative zoom coefficient. More specifically, the memory control circuit 30 first determines the initial value of the mode by the position information of the zoom start pixel. Successively, the memory control circuit 30 detects the integer part of each of the H cumulative zoom coefficients, and sets the mode forward by the difference between the integer part previously detected and the integer part currently detected. When the zoom magnification is "2.5", the position information of the zoom start pixel is "2" according to the equation (2), and therefore, the initial value of the mode becomes "2". Furthermore, in a case of FIG. 7, when the H cumulative zoom coefficient indicates "1.2", "2.0", "3.2" or "4.0", the difference becomes "1". Thus, the mode progresses from "2" to "3" at a time "1.2" is obtained, progresses from "3" to "4" at a time "2.0" is obtained, progresses from "3" to "4" at a time "3.2" is obtained, and progresses from "4" to "5" at a time "4.0" is obtained. It is noted that when the mode progresses to the "7", the mode is then returned to the "0". The mode is renewed in such a manner, and one pixel of YUV data in the previous line and one pixel of YUV data in the current line are simultaneously outputted from the register 36.

Figure 11:
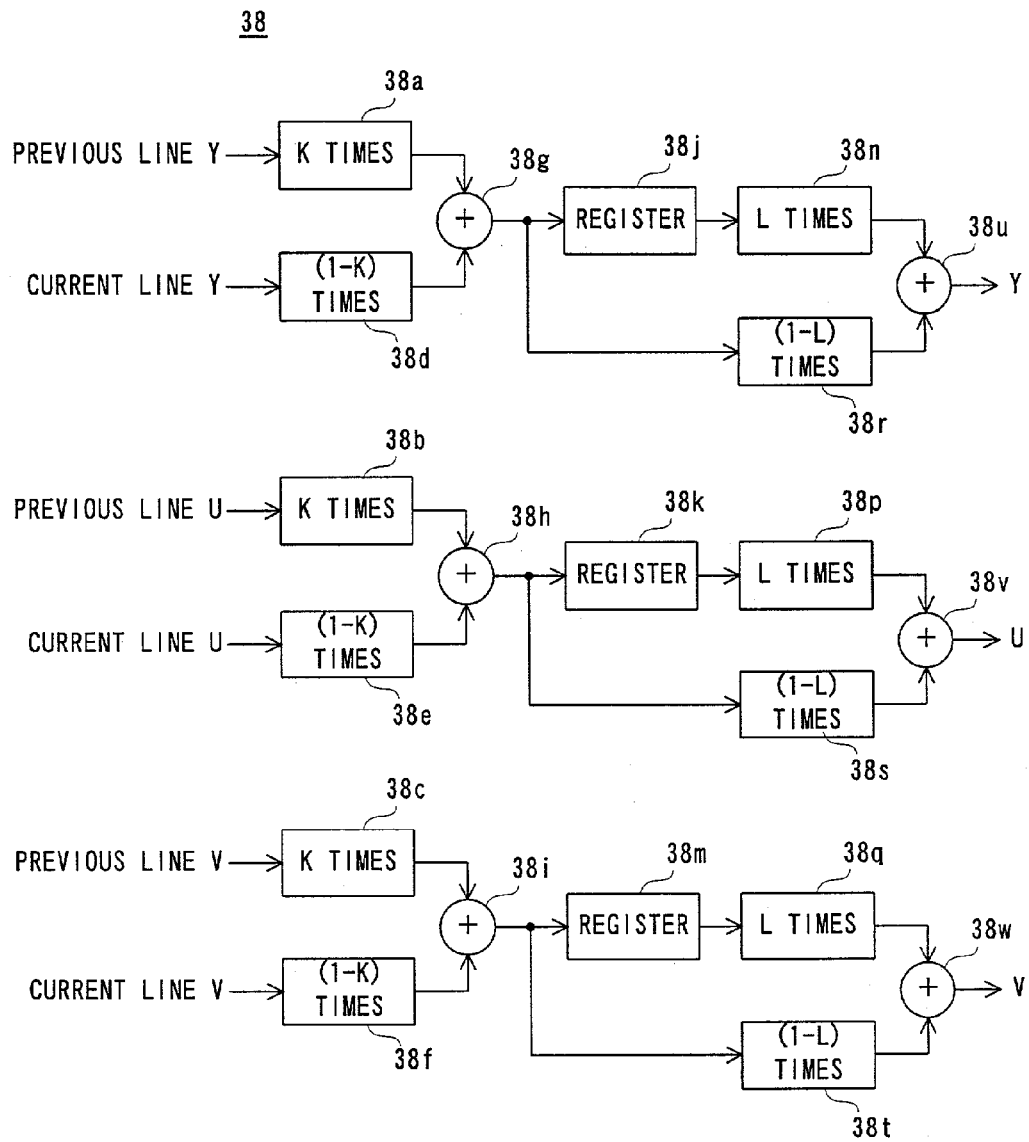
FIG. 11 is a block diagram showing one example of a configuration of an interpolation circuit.

The Y data, the U data and the V data in the previous line are applied to K times circuits 38a, 38b and 38c of an interpolation circuit 38 shown in FIG. 11, respectively, and the Y data, the U data and the V data in the current line are applied to (1-K) times circuits 38d, 38e and 38f, respectively. Herein, the vertical interpolation coefficient K corresponds to a decimal part of the V cumulative zoom coefficient calculated in the coefficient calculating circuit 34. The Y data in the previous line and the Y data in the current lines weighted in accordance with the vertical interpolation coefficient K are added by an adder 38g, and whereby, vertical interpolation is completed. The U data and the V data are also added by adders 38h and 38i, respectively. Referring to FIG. 8, when the V cumulative zoom coefficient of "1.6" is obtained, for example, the YUV data of the previous line is multiplied by "0.6", and the YUV data of the current line is multiplied by "0.4". Thus, the YUV data vertically interpolated at a position corresponding to "1.6" shown in FIG. 8 is obtained.

The Y data, the U data and the V data outputted from the adders 38g, 38h and 38i are inputted to L times circuits 38n, 38p and 38q via registers 38j, 38k and 38m, respectively, or directly inputted to (1-L) times circuits 38r, 38s and 38t, respectively. Herein, a horizontal interpolation coefficient L corresponds to the decimal part of the H cumulative zoom coefficient obtained at the coefficient calculating circuit 34. Since the registers 38j to 38m are provided, the Y data, the U data and the V data of previous and current pixels in a horizontal direction are simultaneously inputted to adders 38u, 38v and 38w, and therefore, horizontal interpolation is completed.

As understood from the above-described equations (2) and (5), the integer parts of the H initial value and the V initial value ordinarily indicate "0". Thus, the H initial value and the V initial value correspond to the initial values of the horizontal interpolation coefficient L and the vertical interpolation coefficient K, respectively.

Returning to FIG. 1, the YUV data outputted from the interpolation circuit 38, i.e. the zoomed pixel data is subjected to processing of aperture, white clip, and etc. at an image processing circuit 40 and then outputted from the display 42. That is, a through image of the object enlarged to a desired magnification is displayed on the display 42.

Figure 13:
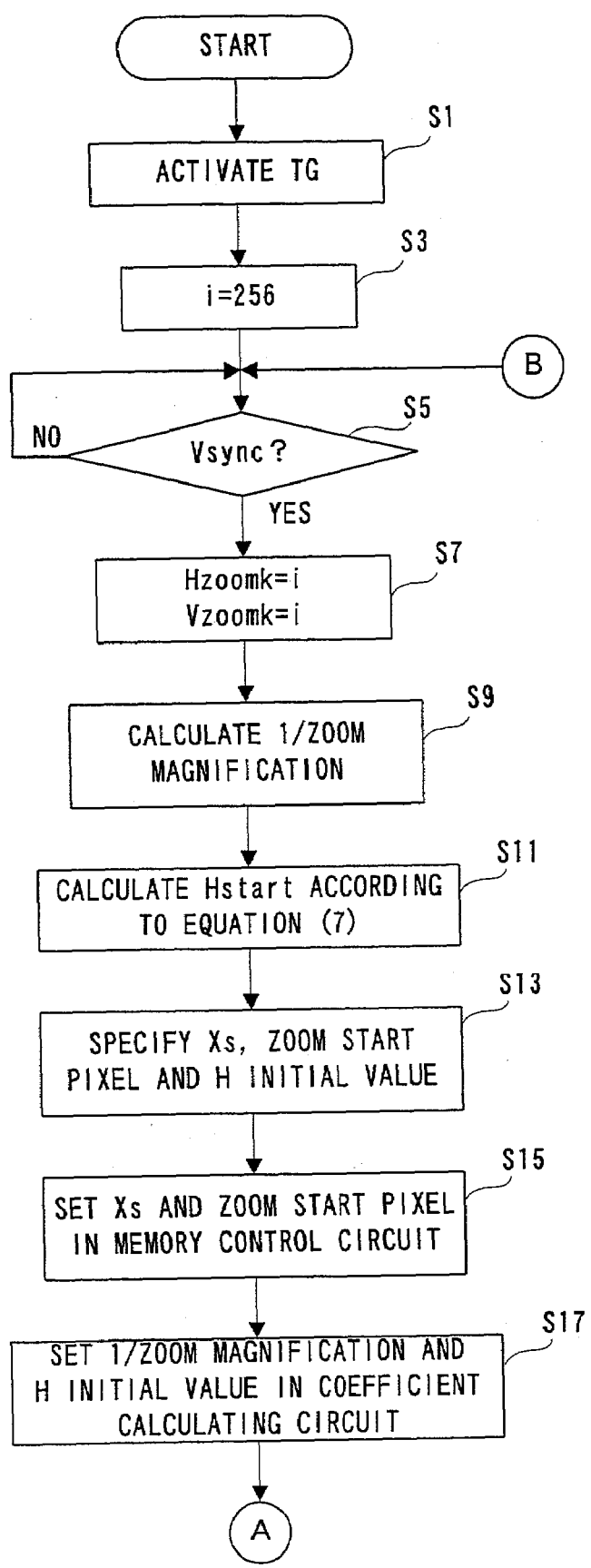
FIG. 13 is a flowchart showing a part of an operation of a CPU.
Figure 14:
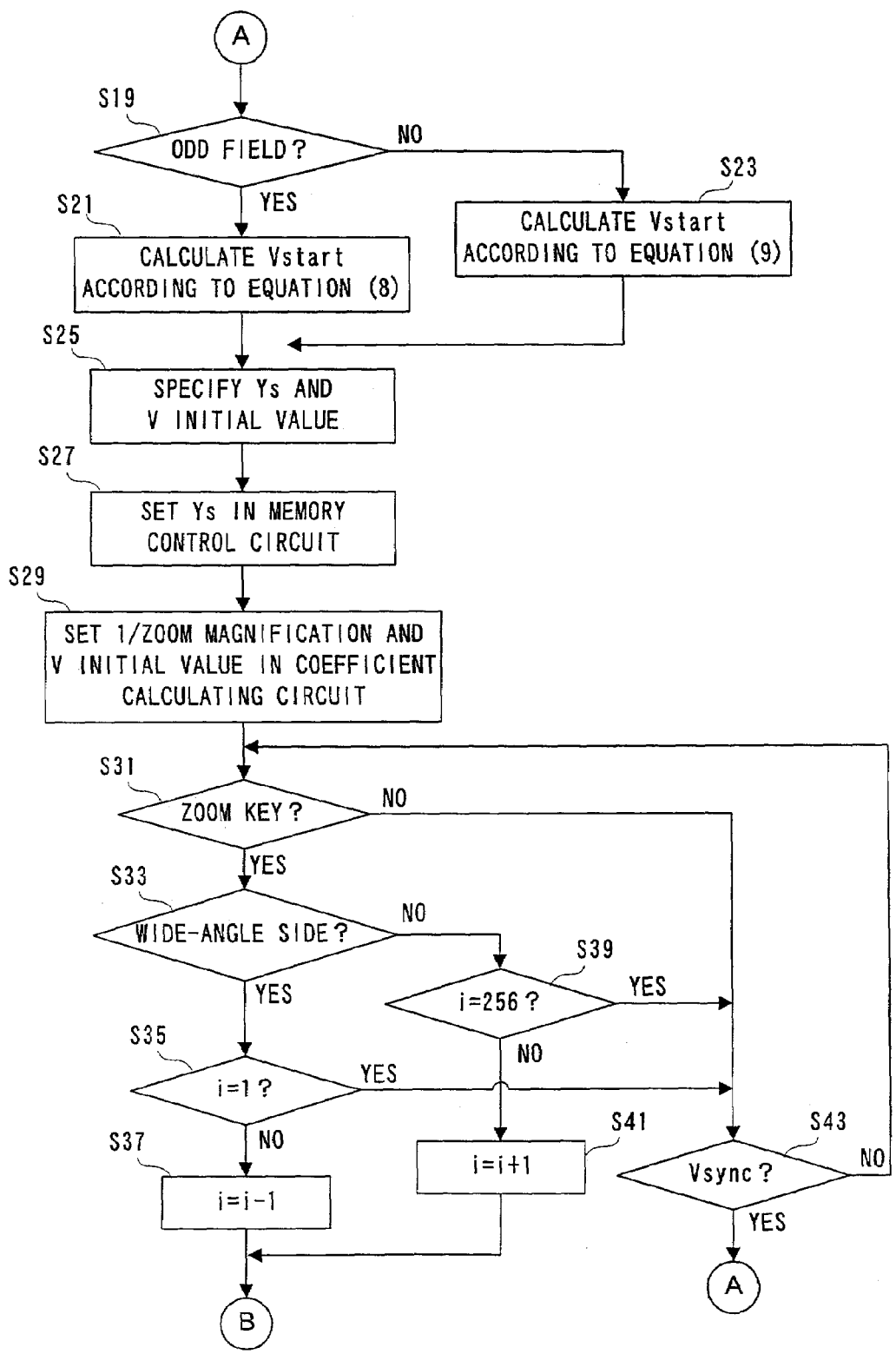
FIG. 14 is a flowchart showing another part of the operation of the CPU.

The CPU 44 is processed according to flowcharts shown in FIG. 13 and FIG. 14. First, the TG 18 is activated in a step S1, and a variable i shall be "256" in a step S3. It is determined whether or not a vertical synchronizing signal having a period of 1/60 second is generated in a step S5, and if "YES" is determined, the variable i is set as a horizontal zoom coefficient Hzoomk and a vertical zoom coefficient Vzoomk. The respective Hzoomk and Vzoomk are coefficients for establishing a relation shown in an equation (6) between the zoom magnification. Accordingly, the closer the variable i is to "256", the smaller the zoom magnification is, and the closer the variable i is to "1", the larger the zoom magnification is.

$$Hzoomk = Vzoomk = (1/\text{zoom magnification})*2^8 \quad (6)$$

A "1/zoom magnification" is calculated on the basis of the equation (6) in a step S9, and the horizontal zoom start information Hstart is calculated in accordance with an equation (7) in a step S11.

$$Hstart = \text{the number of horizontal pixels}/2*(2^8 - Hzoomk) \quad (7)$$

The equations (7) and (1) are different in description manners but have the same meaning. Specifically, the equation (1) is described utilizing the zoom magnification, however; the variable i is renewed in place of the zoom magnification in actual processing, and therefore, the horizontal zoom start information Hstart is obtained by the equation (7).

The reading-out start address Xs, the position information of the zoom start pixel and the H initial value are specified on the basis of the horizontal zoom start information Hstart calculated by the equation (7) in a step 13. The reading-out start address Xs and the position information of the zoom start pixel are applied to the memory control circuit 30 in a step S15, and the "1/zoom magnification" and the H initial value are applied to the adder 34a and the selector 34b of the coefficient calculating circuit 34 shown in FIG. 6 in a step S17.

It is determined whether a current field is the odd field or the even field in a step S19. In a case of the odd field, the process proceeds to a step S21, and the vertical zoom start information Vstart ODD is calculated in accordance with an equation (8); however, in a case of the even field, the process proceeds to a step S23, and the vertical zoom start information Vstart EVEN is calculated in accordance with an equation (9). The equations (8) and (9) are substantially the same with the equations (3) and (4).

$$Vstart\ ODD = \text{the number of vertical lines}/2*(2^8 - Vzoomk) \quad (8)$$

$$Vstart\ EVEN = Vstart\ ODD + INT\ (Vzoomk/2) \quad (9)$$

The reading-out start address Ys and the V initial value are specified from the calculated vertical zoom start information in a step S25, the reading-out start address Ys is applied to the memory control circuit 30 in a step S27, and the "1/zoom magnification" and the V initial value are applied to the adder 34d and the selector 34e of the coefficient calculating circuit 34 shown in FIG. 6. As a result, the zoomed image according to the zoom magnification calculated in the step S9 is displayed on the display 42.

It is determined whether or not a zoom key 46 is operated in a step S31, and it is determined whether or not the vertical synchronizing signal is generated in a step 43. When the vertical synchronizing signal is generated in a state the zoom key 46 is not operated, "YES" is determined in the step S43, and the process repeats the steps S19 to S29.

When the zoom key 46 is operated, the process proceeds from the step S31 to a step S33, and it is determined which zoom operation is performed among a wide-angel side and a telephoto side. If the zoom operation is performed toward the wide-angle side, it is determined whether or not the variable i is "1" in a step S35, and where a condition of i>1 is satisfied, the variable i is decremented in a step S37 and then, the process returns to the step S5. On the other hand, if the zoom operation is performed toward the telephoto side, it is determined whether or not the variable i is "256" in a step S39, and where a condition of i<256 is satisfied, the variable i is incremented in a step S41, and then, the process returns to the step S5. It is noted that if "YES" is determined in the step S35 or the step S39, a renewal of the variable i is regarded to be impossible, and then, the process shifts to the step S43. At this time, the operation of the zoom key 46 is made invalid.

As understood from the above description, the SDRAM 28 is stored with the YUV data so that the horizontal four pixels are assigned to each address. When the through image subjected to an enlargement zooming process is displayed on the display 42, the zoom start pixel is specified by the CPU 44 on the basis of the zoom magnification. The memory control circuit 30 transfers two lines of YUV data from the SDRAM 28 to the line memory 32 with reference to an address to which the zoom start pixel is assigned, and furthermore, a part of the YUV data transferred to the line memory 32 is transferred to the register 36. The line memory 32 and the register 36 are stored with the YUV data so that one pixel is assigned to each address. The YUV data stored in the register 36 is subjected to zoom processing with reference to the zoom start pixel by the memory control circuit 30, the coefficient calculating circuit 34 and the interpolation circuit 38. Thus, the through image which is subjected to the enlargement zooming process is displayed on the display 42.

One pixel is assigned to each address of the line memory 32 and the register 36, and the zoom processing is executed with reference to the zoom start pixel specified on the basis of the zoom magnification. When the zoom magnification is continuously changed, the zoom start pixel which is a reference of the zoom processing is renewed by one pixel unit. Therefore, it is possible to smoothly change the zoomed image in response to an operation of the zoom key.

It is noted that one pixel is assigned to each address of the line memory and the register in this embodiment, it is needless to say that the number is not limited to one pixel as long as it is smaller than the number of pixels (four pixels) assigned to each address of the SDRAM.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital zoom apparatus which creates zoomed image data by performing a zoom process on image data stored in a first memory such that a first number of pixels are assigned to each address, comprising:

a specifier for specifying a zoom start pixel on the basis of a zoom magnification;

a second memory having addresses each of which a second number of pixel(s) smaller than the first number of pixels is assigned to;

a transferor for transferring the image data from said first memory to said second memory with reference to an address to which the zoom start pixel is assigned; and a zoom processor for performing the zoom process on the image data transferred to said second memory with reference to the zoom start pixel, wherein said specifier specifies the zoom start pixel on the basis of an integer value acquired by multiplying a reciprocal of the zoom magnification by a predetermined value and the number of pixels of the image data stored in said first memory in a zoom direction, and said digital zoom apparatus further comprises a renewer for successively renewing the integer value.

2. A digital zoom apparatus according to claim 1, wherein the first number of pixels are pixels being successive in a horizontal direction, and the zoom direction is the horizontal direction.

3. A digital zoom apparatus according to claim 1, wherein the predetermined value is a power of 2.

4. A digital camera provided with a digital zoom apparatus according to any one of claims 1 to 3.

5. A digital zoom apparatus, comprising:

a first memory for storing image data such that a first number of pixels are assigned to each address;

a second memory having addresses to each of which a second number of pixel(s) smaller than the first number of pixels is assigned;

a calculator for calculating a zoom start position coefficient based on a zoom coefficient and the number of pixels of the image data in a zoom direction;

a specifier for specifying a transfer start address value and a zoom start pixel number based on the zoom start position coefficient calculated by said calculator;

a transferor for transferring the image data from said first memory to said second memory with reference to the transfer start address value specified by said specifier; and a zoom processor for performing a zoom process on the image data transferred to said second memory by said transferor with reference to the zoom start pixel number specified by said specifier, wherein the zoom coefficient is indicated by an integer value acquired by multiplying a reciprocal of the zoom magnification by a predetermined value, and said specifier identifies a quotient acquired by a first calculation which divides the zoom start position coefficient by a multiplied value of the first number and the predetermined value as the transfer start address value, and identifies a quotient acquired by a second calculation which divides a remainder acquired by the first calculation by a multiplied value of the second number and the predetermined value as the zoom start pixel number, and said digital zoom apparatus further comprising a renewer for successively renewing the integer value at a time of accepting a renewing instruction.

6. A digital zoom apparatus according to claim 5, wherein the first number is indicated by $2^M$ (M: integer), and the predetermined value is indicated by $2^N$ (N: integer).

7. A digital zoom apparatus according to claim 5, wherein the first number of pixels are pixels being successive in a horizontal direction, and the zoom direction is the horizontal direction.

8. A digital camera provided with a digital zoom apparatus according to any one of claims 5–7.

* * * * *